No. 614,376. Patented Nov. 15, 1898.
W. V. ELLIOTT.
DENTAL PLUGGER.
(Application filed May 24, 1898.)
(No Model.)
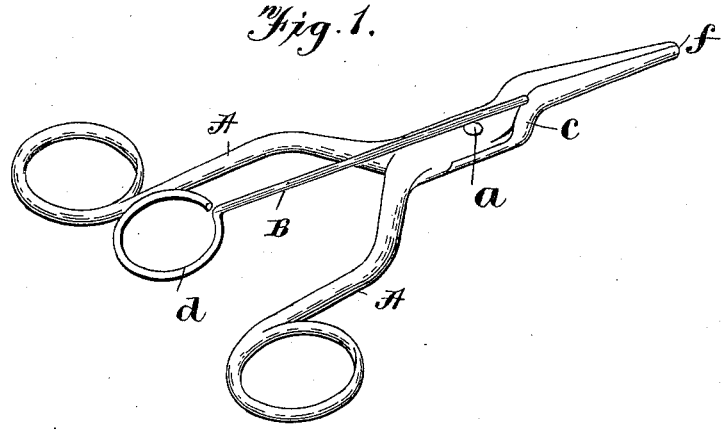
Fig. 1.
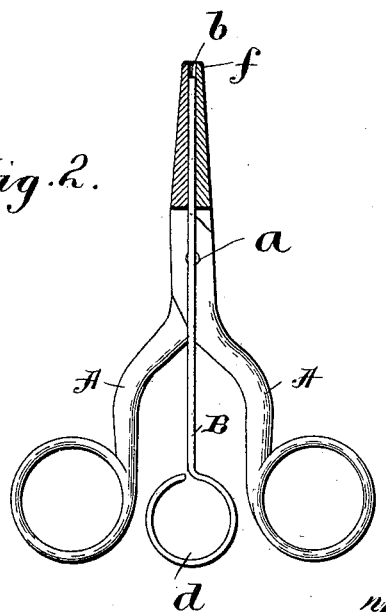
Fig. 2.
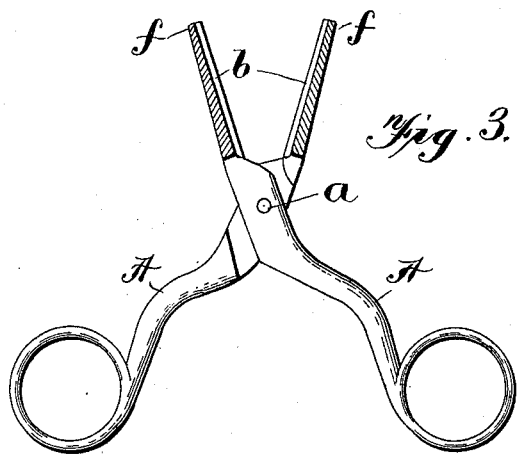
Fig. 3.
Fig. 4.
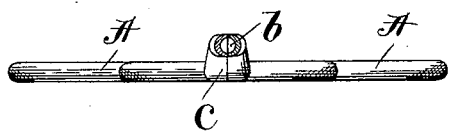
Witnesses
Geo. E. Truch
B. E. Seitz
Inventor
W. V. Elliott
by A. S. Pattison
Attorney
THE NORRIS PETERS CO., PHOTO-LITHO., WASHINGTON, D. C.

UNITED STATES PATENT OFFICE.

WALTER V. ELLIOTT, OF ELMIRA, NEW YORK.

DENTAL PLUGGER.

SPECIFICATION forming part of Letters Patent No. 614,376, dated November 15, 1898.

Application filed May 24, 1898. Serial No. 681,623. (No model.)

*To all whom it may concern:*

Be it known that I, WALTER V. ELLIOTT, a citizen of the United States, residing at Elmira, in the county of Chemung and State of New York, have invented new and useful Improvements in Dental Pluggers, of which the following is a specification.

My invention relates to improvements in dental pluggers which are especially intended for dental purposes, though it may be used in any connection for which it is adapted, all of which will be fully described hereinafter and particularly referred to in the claims.

The object of my invention is to provide a dental plugger, the cylinder or plunger-tube consisting of two separable parts with a handle or handles for holding them closed, whereby the parts may be separated and filled with the cement and the plunger then placed therein and the cement forced out the opposite end into the cavity of the tooth-root when used for dental purposes.

In the accompanying drawings, Figure 1 represents a perspective view of an implement embodying my invention. Fig. 2 is a sectional view taken longitudinally through the cylinder or plunger-tube. Fig. 3 is a view showing the implement open for receiving the cement.

My implement is preferably made in appearance similar to a pair of scissors, consisting of the two parts or handles A, pivoted together at *a*, with their opposite nose or tubular ends provided at their inner sides with longitudinal grooves *b*, into which the cement is placed in any desired manner.

When the implement is closed, as shown in Fig. 1, the grooves form a tube or barrel open at both ends, whereby a plunger-rod B can be placed in the rear end of the barrel and the cement forced out the opposite end, as will be readily understood. This plunger B is preferably provided at one end with an eye or ring *d*, forming a handle by which it is conveniently handled.

Preferably the nose of the implement is turned laterally, as shown at *c*, so that the barrel is in a different plane from the plane of the handles, whereby the plunger may be forced into the barrel without interference from other parts of the instrument. The nose of the implement is tapered to a point, as shown at *f*, whereby the implement is adapted to have its nose placed in the upper end of the root-cavity of the tooth and the cement be forced therein by means of the plunger.

In dentistry the cement which is forced into the root-cavity hardens very quickly and should be handled quickly.

By an implement of the character here shown the dentist can quickly use his mixing implement or spatula to draw across one part of the barrel of the implement when it is opened, and then by closing the implement the cement is inclosed therein and the implement placed with its nose in the cavity of the root of the tooth and the plunger then placed in the rear end of the barrel and the cement forcibly pressed into the cavity of the tooth in a very efficient and convenient manner.

While I have described my implement as especially adapted for dentists' use, I do not limit myself to that particular use, for there may be other connections in which an implement of this character will be found very convenient and efficient.

Having thus described my invention, what I claim, and desire to secure by Letters Patent, is—

1. A dental plugger comprising two longitudinally-separable members having at their inner sides longitudinal grooves, and a plunger longitudinally movable within the grooves when the members are closed, substantially as described.

2. A dental plugger comprising two pivoted members having at their inner sides longitudinal registering grooves and a plunger longitudinally movable within said grooves when the pivoted parts are closed together, substantially as described.

3. A dental plugger comprising two intermediately-pivoted members one end of the members forming handles, the inner sides of the opposite ends of the members having longitudinal registering grooves adapted to form a barrel when the grooved members are closed, substantially as described.

4. A dental plugger comprising two intermediately-pivoted members having one of their ends diverging to form handles, their opposite ends provided at their inner sides with longitudinal registering grooves, a plunger situated and longitudinally movable within the grooves, the rear end of the plunger projecting between the diverging handles for the purpose described.

5. A dental plugger comprising two intermediately-pivoted members, one end adapted to form handles, the opposite end having longitudinal registering grooves adapted to form a barrel when closed together, the grooved ends bent laterally and in a different plane from the plane of the handles, and a plunger longitudinally movable within the grooves, substantially as described.

In testimony whereof I have hereunto set my hand in the presence of two subscribing witnesses.

WALTER V. ELLIOTT.

Witnesses:
WALLACE MURDOCK,
GEO. E. FRECH.